(12) United States Patent
Watkins et al.

(10) Patent No.: US 6,229,659 B1
(45) Date of Patent: May 8, 2001

(54) METHODS AND APPARATUS FOR STORING DATA AND AUXILIARY INFORMATION

(75) Inventors: Mark Robert Watkins, Westbury Park; Nigel Rushton, Rudgeway, both of (GB); Shinya Ozaki, Yamato (JP)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/532,776

(22) PCT Filed: Feb. 16, 1995

(86) PCT No.: PCT/GB95/00332

§ 371 Date: Sep. 9, 1998

§ 102(e) Date: Sep. 9, 1998

(87) PCT Pub. No.: WO95/22826

PCT Pub. Date: Aug. 24, 1995

(30) Foreign Application Priority Data

Feb. 17, 1994 (GB) .................................................. 9403025

(51) Int. Cl.[7] ............................................ G11B 5/09
(52) U.S. Cl. ............................ 360/48; 360/49; 360/72.2; 360/53
(58) Field of Search ........................ 360/48, 49, 72.2, 360/74.4, 51, 53; 714/701

(56) References Cited

U.S. PATENT DOCUMENTS

| | | | |
|---|---|---|---|
| 4,357,638 | * 11/1982 | Yoshimaru et al. | 360/49 X |
| 5,172,380 | * 12/1992 | Odaka | 360/48 X |
| 5,276,561 | * 1/1994 | Fukami | 360/49 X |
| 5,982,572 | * 11/1999 | Dahlerud | 360/49 X |

FOREIGN PATENT DOCUMENTS

| | | | |
|---|---|---|---|
| 0 224 186 | 11/1986 | (EP) . | |
| 0 323 890 | 1/1989 | (EP) . | |
| 0 327 188 | 1/1989 | (EP) . | |
| 0 329 265 | 1/1989 | (EP) . | |
| 323890 | * 7/1989 | (EP) | 360/48 |
| 327188 | * 8/1989 | (EP) | 360/48 |
| 0 386 362 | 10/1989 | (EP) . | |
| 0 429 727 | 11/1989 | (EP) . | |
| 386362 | * 9/1990 | (EP) | 360/48 |
| 0 454 464 | 4/1991 | (EP) . | |
| 429727 | * 6/1991 | (EP) | 360/48 |
| 454464 | * 10/1991 | (EP) | 360/48 |
| 0 519 764 | 6/1992 | (EP) . | |
| WO 91/10998 | 1/1991 | (WO) . | |
| WO91/10998 | * 7/1991 | (WO) | 360/48 |

* cited by examiner

Primary Examiner—Alan T. Faber (57) ABSTRACT

Data are stored on magnetic tape along successive tracks extending obliquely across the tape, in each of several areas including a lead-in area, a data area and an end-of-data (EOD) area. Each track comprises successive blocks or fragments of data, and each fragment has a compact header containing a synchronization byte, six information bytes and two parity bytes. The information bytes include a fragment ID, an area ID sub code identifying the area in which the fragment is located, and various other sub codes relating to logical structure of the data. The inclusion of an area ID sub code and logical structure sub codes in the (compact) header of every fragment facilitates reliable searching of the data stored on the tape at high tape advance speeds.

18 Claims, 4 Drawing Sheets

METHODS AND APPARATUS FOR STORING DATA AND AUXILIARY INFORMATION

TECHNICAL FIELD

This invention relates to methods and apparatus for storing digital signals containing data and auxiliary information in each of a plurality of tracks extending over a recording medium, and particularly, though not exclusively, to methods and apparatus for storing auxiliary information in a DDS data storage system.

BACKGROUND ART

It is already known to provide reliable storage and retrieval of large volumes of digital data, such as computer data, in particular by means of the DDS (Digital Data Storage) format defined in ISO/IEC Standard 10777:1991 E.

In the DDS system an elongate recording media comprising tape coated with a magnetic medium is moved by a motor-driven capstan in a DDS read/write mechanism along a path extending between two spools or reels and wrapped partially around a transducer contained in the mechanism and comprising a rotating drum carrying one or more electromagnetic heads. The plane of rotation of the drum is disposed at an angle to the plane of movement of the tape, so that each head traverses the tape along successive tracks extending across the width of the tape at an angle to its centreline.

Each track comprises seven portions or areas, extending in succession from adjacent one edge of the tape to adjacent the other edge: a marginal area, a sub area, an ATF (automatic track following) area, a main area, a second ATF area, a second sub area, and a second marginal area. The data to be stored by the system (e.g. computer data), hereinafter referred to as 'main data', are stored in the main area, together with some auxiliary information ('sub codes') relating to the operation of the data storage system itself. Additional auxiliary information, relating for example to the logical structure of the main data, is stored in the sub areas.

A section of tape containing a body of main data is itself considered to comprise several successive areas, including a device area, a reference area, a system area, a data area and an EOD (end of data) area. These different areas are distinguished from one another by respective values of an 'Area ID' sub code. This Area ID sub code is stored, according to the above-mentioned standard, in the sub areas adjacent the ends of each successive track. Typically an EOD area is marked on the tape after a write session has been completed, and just before the tape is ejected from the DDS read/write mechanism.

One use of the Area ID sub code indicating the EOD area (the 'EOD sub code'), and of sub codes relating to the logical structure of the main data, is for fast searching for data stored on the tape. Thus the tape may be advanced past the rotary head drum at a speed several times faster than that used during normal reading and writing of data. The drum heads read the sub codes in the sub areas, and by detecting EOD and other sub codes can quickly locate specific items of data, or the end-of-data, without having to read the data themselves.

However, this fast search technique is completely reliant on successful detection of the relevant sub codes, and in particular the EOD area. If the EOD area is missed the system may try to retrieve data from an area of tape containing old data the first part of which has been overwritten by more recent data, with the result that invalid data may be supplied by the system. If sub codes relating to the logical structure of the data are not detected, the tape may be advanced well past the required location. This in turn requires rewinding of the tape and repetition of the search, thereby defeating the object of a 'fast' search. In order to avoid these problems it has been found necessary in practice to limit the speed of advance of the tape during fast search to a value considerably below the maximum possible value at which the tape can be advanced while sub codes are still, in principle, detectable by the rotary drum heads. This is turn has placed an undesirable restriction on the maximum speed at which fast searching may be accomplished.

It is an object of this invention to alleviate this problem.

DISCLOSURE OF INVENTION

According to one aspect of this invention there is provided a method of storing digital signals containing data and auxiliary information (such as EOD and other sub codes) in each of a plurality of tracks extending over a recording medium, comprising the steps of:

forming in each track a single storage area for storing data and auxiliary information in that track;

dividing said storage area into a plurality of sections each comprising a header portion and a data portion;

selecting a section for storage of auxiliary information;

generating an item of auxiliary information indicative of at least one of: (a) logical position on said medium of said selected section (e.g. in the EOD area), (b) logical position of data to be stored in said data portion of said selected section, relative to data stored on said medium (e.g. logical structure of the data), and (c) identification of a format according to which data are stored on said medium; and storing said item of auxiliary information in said header portion of every section within a storage area occupied by said selected section.

A single track typically includes many sections (e.g. several tens). By storing auxiliary information (such as EOD and/or other sub codes) in the header portion of these sections (also referred to herein as 'fragments'), it is possible to arrange, for example, for EOD codes to be repeated in every section across every track in the EOD area. This significantly increases the number of EOD codes in each track, thereby facilitating detection of the EOD codes during fast searching. Accordingly the speed of tape advance for fast searching can be increased beyond that currently considered to be a practicable maximum without incurring any significant risk of failure to detect the EOD area. Similar repetition of the sub codes relating to logical structure of data likewise assists their detection during fast searching at such increased speed.

According to another aspect of this invention there is provided apparatus for storing digital signals containing data and auxiliary information in each of a plurality of tracks extending over a recording medium, comprising:

means for forming in each track a single storage area for storing data and auxiliary information in that track;

means for dividing said storage area into a plurality of sections each comprising a header portion and a data portion;

means for selecting a section for storage of auxiliary information;

means for generating an item of auxiliary information indicative of at least one of: (a) logical position on said medium of said selected section, (b) logical position of data to be stored in said data portion of said selected section, relative to data stored on said medium, and (c) identification of a format according to which data are stored on said medium; and means for storing said item of auxiliary information in said header portion of every section within a storage area occupied by said selected section.

BRIEF DESCRIPTION OF DRAWINGS

Methods and apparatus for storing data and auxiliary information in accordance with this invention will now be described, by way of example, with reference to the accompanying drawings, in which.

BEST MODE FOR CARRYING OUT THE INVENTION, & INDUSTRIAL APPLICABILITY

The data storage apparatus now to be described utilizes a helical scan technique for storing data in oblique tracks on a recording tape in a format similar to that used for the storage of PCM audio data according to the DAT Conference Standard (June 1987, Electronic Industries Association of Japan, Tokyo, Japan). The present apparatus is, however, adapted for storing computer data rather than digitized audio information.

Figure 1:
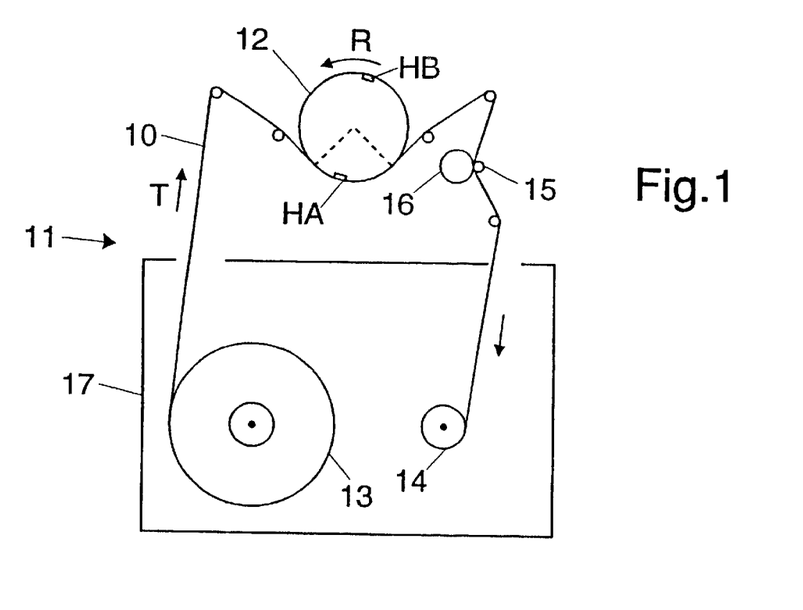
FIG. 1 is a diagram illustrating the main physical components of a tape deck employing helical scan recording.
Figure 2:
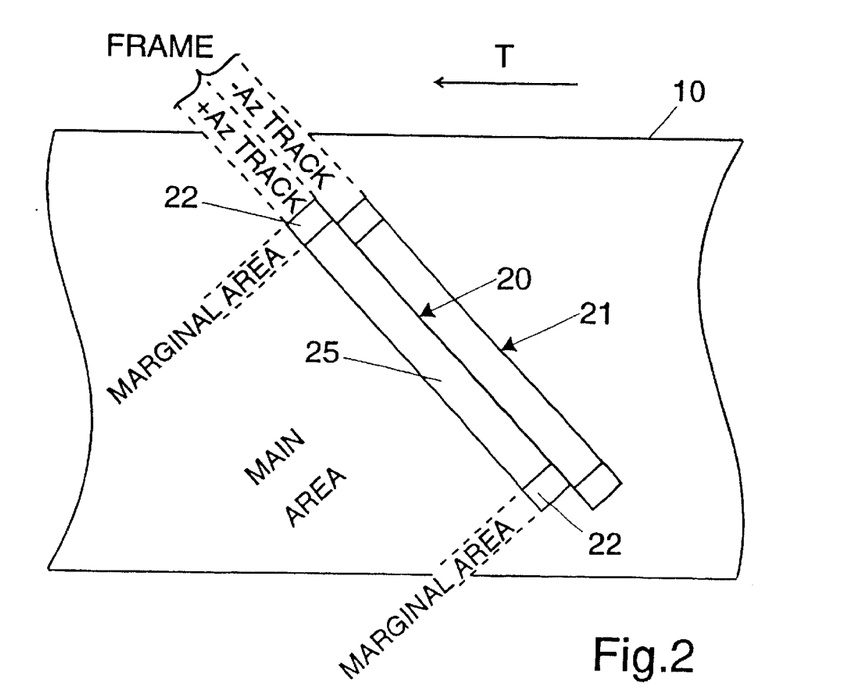
FIG. 2 is a diagrammatic representation of two data tracks recorded on tape using helical scan recording.

FIG. 1 shows the basic layout of a helical-scan tape deck 11 in which tape 10 from a tape cartridge 17 passes at a predetermined angle across a rotary head drum 12 with a wrap angle of approximately 90°. In operation, the tape 10 is moved in the direction indicated by arrow T from a supply reel 13 to a take-up reel 14 by rotation of a capstan 15 against which the tape is pressed by a pinch roller 16; at the same time, the head drum is rotated in the sense indicated by arrow R. The head drum 12 houses two read/write heads HA, HB angularly spaced by 180°. In known manner, these heads HA, HB are arranged to write overlapping oblique tracks 20, 21 respectively across the tape 10 as shown in FIG. 2. The track written by head HA has a positive azimuth while that written by head HB has a negative azimuth. Each pair of positive and negative azimuth tracks, 20, 21 constitutes a frame.

The basic format of each track as arranged to be written by the present apparatus is illustrated in FIG. 2. Each track comprises two marginal areas 22 and a main area 25. The main area 25 is used to store data provided to the apparatus (main data), together with certain auxiliary information. The items of auxiliary information are known as sub codes and relate, for example, to the logical organization of the main data, its mapping onto the tape, certain recording parameters (such as format identity, tape parameters etc.), and tape usage history. The main area 25 also includes synchronization bytes ('sync bytes') which enable the boundaries between successive data bytes stored on the tape to be identified, and which are also used to generate timing signals for controlling the heads HA, HB to follow the tracks accurately, for example in a manner similar to that described in European patent application No. 0 224 186.

Figure 3:
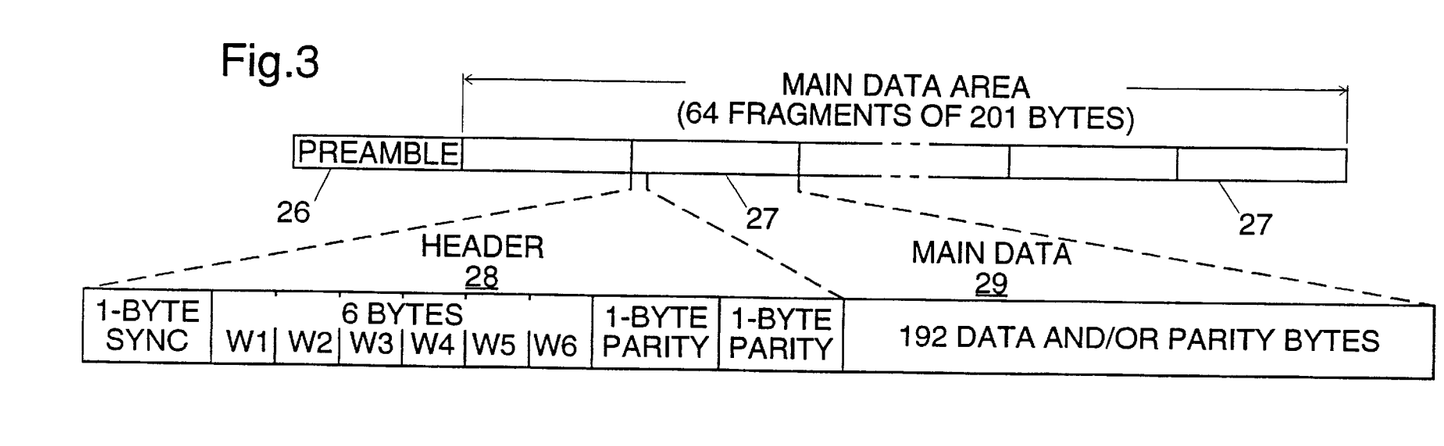
FIG. 3 is a diagrammatic representation of the format of a main data area of a data track.

The data format of the main area 25 of a track is illustrated in FIG. 3. The main 30 area is composed of a pre-amble block 26, followed by sixty-four sections or 'fragments' 27 each two hundred and one bytes long. The block 26 is a pre-amble which contains timing data patterns to facilitate timing synchronization on playback. The fragments 27 make up the 'Main Data Area'. Each fragment 27 in the Main Data Area comprises a nine-byte 'Header' region 28 and a one hundred and ninety-two byte 'Main Data' region 29, the compositions of which are shown in the lower part of FIG. 3.

The Header region 28 is composed of a sync byte as mentioned above, six information-containing bytes W1 to W6, and two parity bytes. As is described in more detail below, the bytes W1 and W2 are used for storing information relating to the fragment as a whole (type and address), while the bytes W3 to W6 in particular are used to store sub codes.

The Main Data region 29 of each fragment 27 is composed of one hundred and ninety-two bytes (comprising six successive thirty-two byte blocks) generally constituted by main data and/or main-data parity. However, it is also possible to store sub codes in the Main Data region if desired.

In summary, main data are stored in the Main Data regions 29 of the Main Data Area fragments 27 of each track, while sub codes can be stored both in the Header and Main Data regions 28, 29 of Main Data Area fragments 27.

Figure 4:
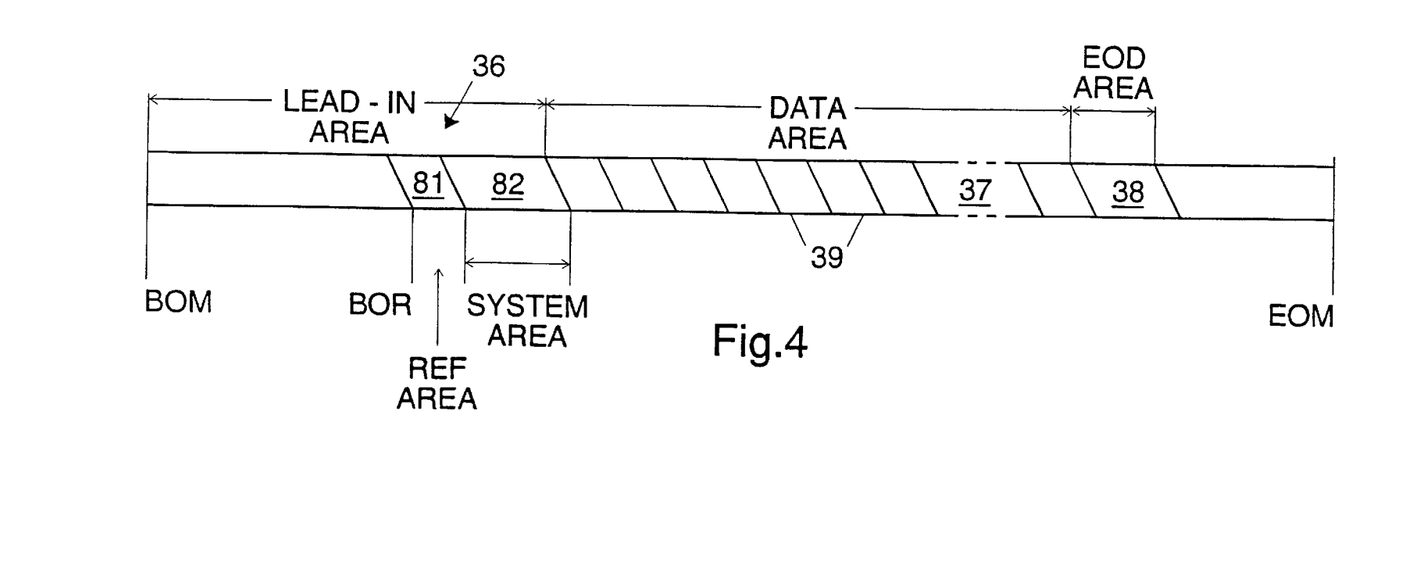
FIG. 4 is a diagram showing the different areas along the length of a recording tape used in the apparatus.

FIG. 4 illustrates the general organization of frames along the tape implemented by the apparatus. Thus, referring to FIG. 4, the tape can be seen to be organized into three main tape areas, namely a lead-in area 36, a data area 37 and an end-of-data (EOD) area 38. Main data are recorded in the frames of the data area 37. The lead-in area 36 includes a system area 82 for storing tape usage data, and a reference area 81 that precedes the system area 82 and serves as a reference for updating the latter. The system area 82 is followed by the data area 37. If desired, the tape can be arranged to have two partitions, in each of which data may be written independently; each such partition then comprises a respective reference area 81, system area 82, data area 37 and EOD area 38.

Figure 5:
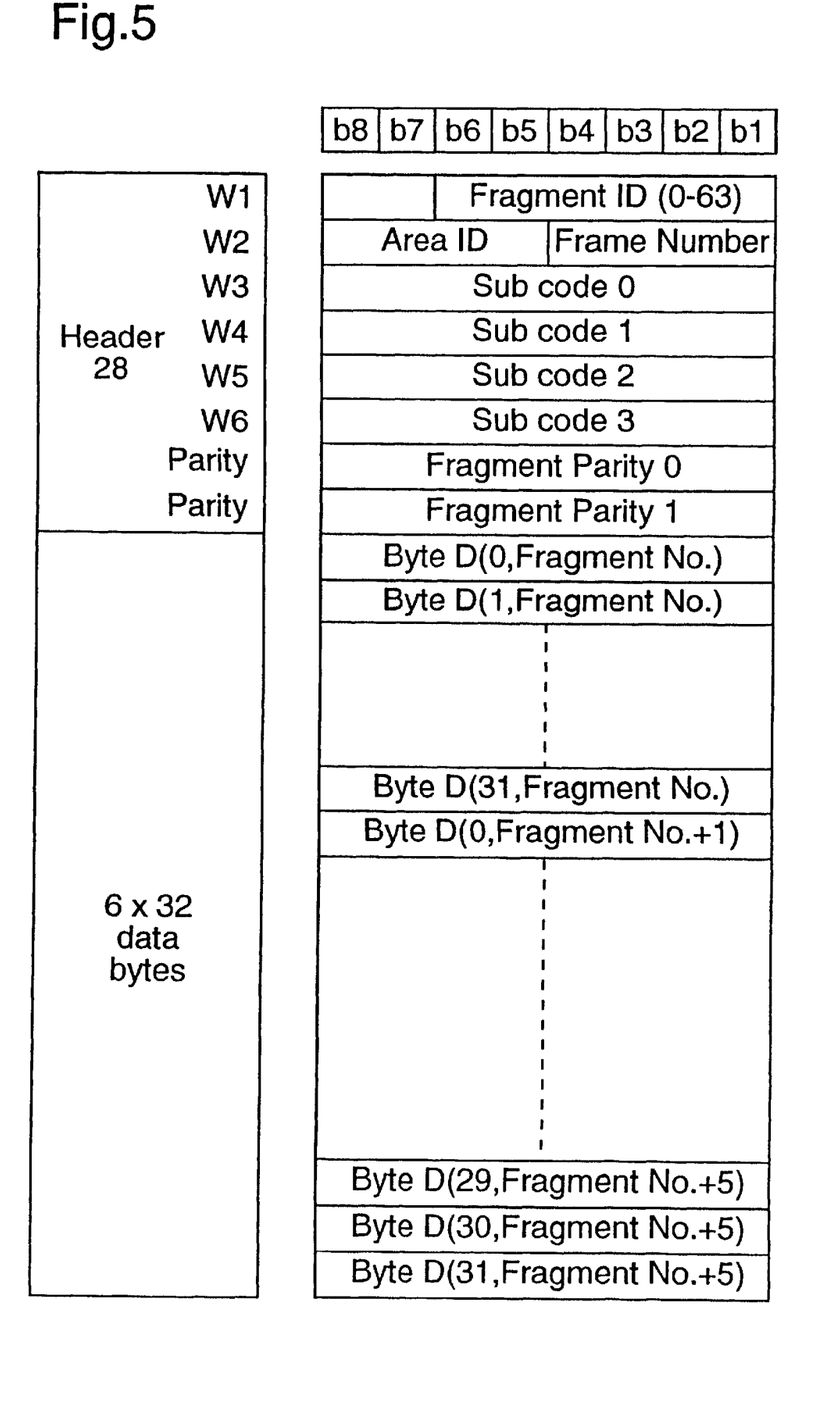
FIG. 5 is a diagrammatic representation of the format of one 'fragment' in the main data area of a data track.

FIG. 5 shows the structure of the Header region 28 in more detail (excluding the initial sync byte). Referring to FIG. 5, the first information byte W1 contains a six-bit Fragment ID which identifies the fragment within the main area 25. Byte W2 contains an Area ID sub code (described below) in its four most significant bits, and a frame number in its four least significant bits which is incremented mod 16 between consecutive frames. Bytes W3 to W6 contain sub codes providing information about the logical structure of the contents of the track and the history of usage of the tape, including, for example:

in the case of data comprising a plurality of records, an indication related to the record number of the record stored in that track;

in the case of data arranged into user-specified files, an indication in terms of number of file marks of the consecutive file to which data in that track belong; and in the case of data arranged into user-specified sets (e.g. corresponding to data saved in one operation or on one particular day), an indication in terms of number of save set marks of the consecutive set to which data in that track belong.

The parity bytes comprise a sixteen-bit cyclic redundancy check (CRC) code derived from the contents of the remainder of the Header region.

For the purposes of the present description, one sub code of primary interest is the Area ID sub code used to identify the partition and tape area in which particular tracks are located (i.e. their logical position on the tape). The Area ID sub code enables the reference area 81, system area 82, data area 37 and EOD area 38 to be distinguished from one another upon playback. This Area ID sub code is a four-bit code stored in the more significant half (bits b8 to b5) of byte W2 in the Header region 28 of every fragment 27 in a track (see FIG. 5). The possible values of the Area ID sub code are:

0000 Device area
x001 Reference area
x010 System area
x100 Data area
x101 EOD area where x indicates a bit value identifying the partition containing the relevant area. The Area ID sub code in the Header region 28 of a fragment 27 is set to the value corresponding to the partition and tape area in which the track containing that fragment is located. Thus the Area ID sub code for each area is repeated sixty-four times throughout each track located in the respective area.

In the present apparatus, the frames of the data area are arranged in groups 39 (FIG. 4) each of a fixed number of frames (for example, twenty two); optionally, these groups are separated from each other by one or more amble frames of predetermined content. The organization of main data into such groups has no relation to the logical structure of the main data and information relating to this structure (for example, record and file marks) is stored in an index that terminates the main data in a group (the index actually occupies main data space within the group). Information regarding this logical structure may also be stored in sub codes (e.g. in header bytes W3 to W6 as explained above) as may other group-dependent items of information.

The ends of the tape are referenced in FIG. 4 as BOM (for Beginning of Media) and EOM (for End Of Media); these positions may correspond to the ends of the tape media as a whole or to the conjunction of the recording media with leader tape sections. A further tape location BOR is also referenced in FIG. 4, this being a Beginning of Recording position which marks the start of the storage of useful data.

Figure 6:
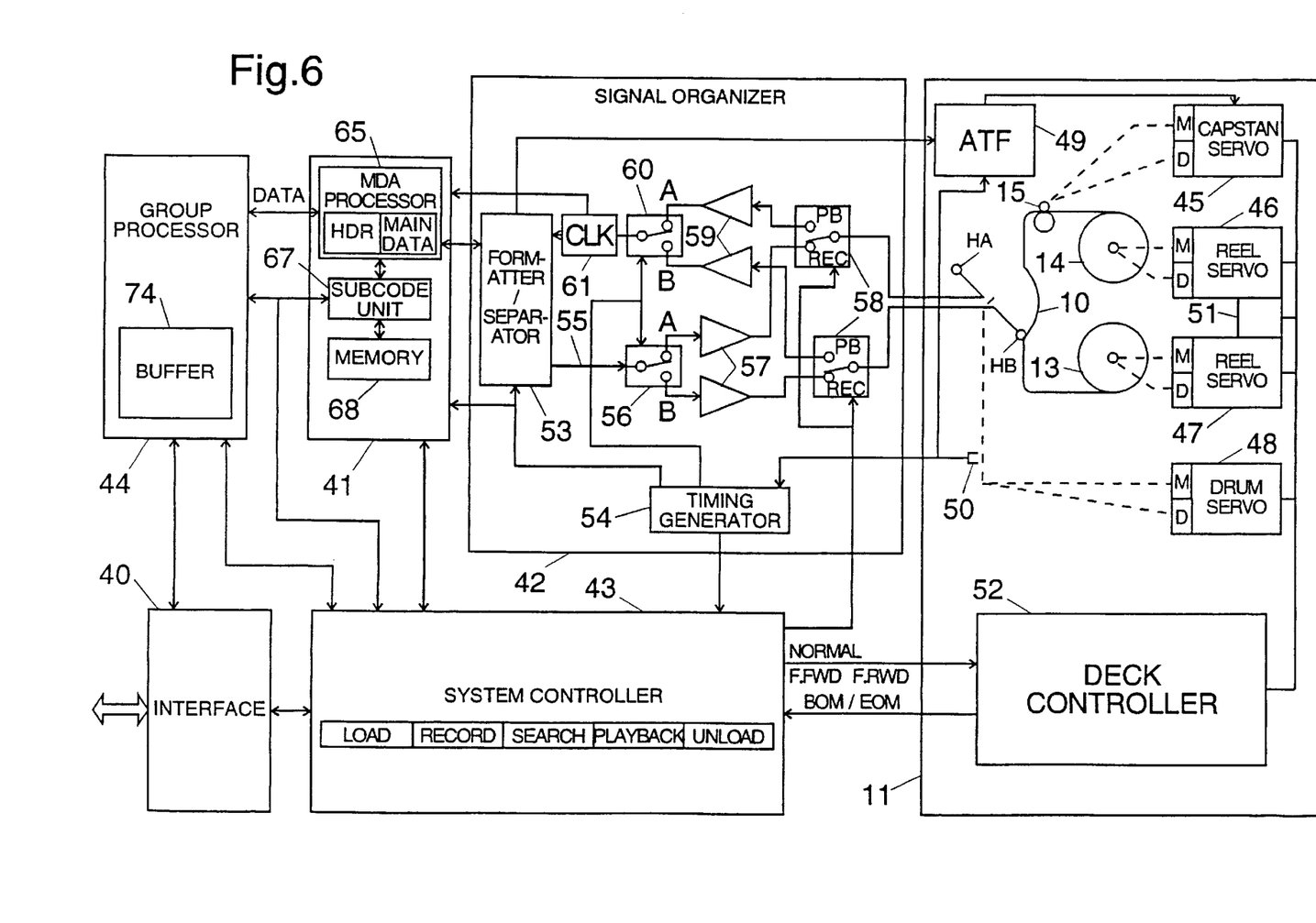
FIG. 6 is a block diagram of the main components of the data storage apparatus.

FIG. 6 is a block diagram of the data storage apparatus in its entirety including the tape deck 11 already described in part with reference to FIG. 1. In addition to the tape deck, the apparatus includes an interface unit 40 for interfacing the apparatus with a computer (not shown); a group processor 44 and a frame data processor 41 for processing main data and sub codes into and out of a Main Data Area fragment 27; a signal organizer 42 for composing/decomposing the signals for writing/reading a track and for appropriately switching the two heads HA, HB; and a system controller 43 for controlling the operation of the apparatus in response to commands received from a computer via the interface unit 40. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The interface unit 40 is arranged to receive the commands from the computer and to manage the transfer of data records and logical data segmentation marks between the apparatus and computer. Upon receiving a command from the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 44 is arranged to segment the main data provided to it in the form of data records into data packages each corresponding to a group's worth of data. This segmentation is effected without regard to the logical organization of the data (that is, how it is divided into records). Information regarding the logical segmentation of the data (record divisions, file marks) is stored in an index which is generated by the processor 44 and which, as already mentioned, forms the last portion of data making up a group. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, three) group's worth of data.

Once a group, including its index, has been assembled, it is transferred a frame at a time to the frame data processor 41. Conceptually there is no need for the frame data processor 41 to be aware of the grouping of frames as the group processor 44 could simply pass it a frame's worth of main data at a time together with the appropriate sub codes. However, in order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

As previously mentioned, it may be desirable to insert one or more amble frames between groups of frames recorded on the tape. This can be done by arranging for the frame data processor 41 to generate such amble frames either upon instruction from the group processor 44 or automatically at the end of a group if the processor 41 is aware of group structure.

When data are being read from tape, the group processor 44 is arranged to receive main data on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

To facilitate the assembly of frame data back into a group's worth of data, each frame can be tagged with an in-group sequence number when the frame is written to tape. This in-group number can be provided as a sub code that, for example, is included at the head of the Main Data region of the first fragment in the Main Data Area of each track of a frame. The sub code is used on playback to determine where the related frame data are placed in the buffer 74 when passed to the group processor 44.

The frame data processor 41 functionally comprises a Main-Data-Area (MDA) processor 65 and a sub code unit 67 with an associated electronic memory 68 for tape usage data (in practice, these functional elements may be constituted by a single microprocessor running appropriate processes under program control).

The sub code unit 67 is arranged to provide sub codes to the processor 65 as required during recording and to receive and distribute sub codes from the processor 65 during playback. Dependent on their information contents, sub codes may be generated/required by the group processor 44 or the system controller; the Area ID sub code is, for example, determined by/used by the controller 43. In the case of non-varying sub codes such as certain recording parameters, the sub codes may be permanently stored in the unit 67. Furthermore, frame-dependent sub codes such as absolute frame number, may conveniently be generated by the sub code unit 67 itself.

With regard to the tape usage sub codes, these are read off from the system area of a tape upon first loading and stored by the unit 67 in the memory 68. During a tape usage session, the tape usage data held in the memory 68 are updated by the unit 67 as appropriate on the basis of inputs received from the processors 44, 65 and the controller 43; thus if a record is kept of the number of main data frames read/written (either directly or in terms of the number of groups read and written), then these data must be continually updated by the unit 67 as a result of inputs from the processor 65 (or possibly the processor 44 if groups are counted). At the end of a tape usage session, the contents of the memory 68 are stored to tape within a log area of the tape system area, the latter being rewritten at the end of each session of usage. The multiple storage of the tape usage sub codes within the log area together with associated parity information, ensures a very high probability that the tape usage sub codes can be read back from the tape even in the presence of tape defects or other similar degradations.

The MDA processor 65 is arranged to process a frame's worth of main data at a time together with the associated sub codes in the fragment Header regions. Thus during recording, the processor 65 receives a frame's worth of main data from the group processor 44 together with sub codes from the unit 67. On receiving the main data the processor 65 interleaves the data, and calculates error correcting codes and parity values, before assembling the resultant data and sub codes to output the Main-Data-Area fragments for the two tracks making up a frame. In fact before assembling the main data with the sub codes, scrambling (randomizing) of the data may be effected to ensure a consistent RF envelope independent of the data contents of a track signal.

During playback, the processor 65 effects a reverse process on the two sets of Main-Data-Area fragments associated with the same frame. Unscrambled, error-corrected and de-interleaved main data are passed to the group processor 44 and sub codes are separated off and distributed by the unit 67 to the processor 44 or system controller 43 as required.

The signal organizer 42 comprises a formatter/separator unit 53 which during recording (data writing) is arranged to assemble Main-Data-Area fragments provided by the frame data processor 41, to form the signal including sync bytes to be recorded on each successive track. The necessary preamble patterns are also inserted into the track signals where necessary by the unit 53. Timing signals for coordinating the operation of the unit 53 with rotation of the heads HA, HB are provided by a timing generator 54 fed with the output of a pulse generator 50 responsive to head drum rotation. The track signals output on line 55 from the unit 53 are passed alternately to head HA and head HB via a head switch 56, respective head drive amplifiers 57, and record/playback switches 58 set to their record positions by the system controller 43. The head switch 56 is operated by appropriate timed signals from the timing generator 54.

During playback (data reading) the track signals alternately generated by the heads HA and HB are fed via the record/playback switches 58 (now set by the system controller 43 to their playback positions), respective read amplifiers 59, a second head switch 60, and a clock recovery circuit 61, to the input of the formatter/separator unit 53. The operation of the head switch 60 is controlled in the same manner as that of the head switch 56. The unit 53 now serves to generate signals indicating the timing of the sync bytes in the track signals and supply them to the ATF circuit 49, and to pass the Main-Data-Area fragments to the frame data processor 41. Clock signals are also passed to the processor 41 from the clock recovery circuit 61.

The tape deck 11 comprises four servos, namely a capstan servo 45 for controlling the rotation of the capstan 15, first and second reel servos 46, 47 for controlling rotation of the reels 13, 14 respectively, and a drum servo 48 for controlling the rotation of the head drum 12 (FIG. 1). Each servo includes a motor M and a rotation detector D both coupled to the element controlled by the servo. Associated with the reel servos 46, 47 is a detector 51 for sensing the beginning-of-media (BOM) and end-of-media (EOM); this detector 51 may be based for example on motor current sensing, as the motor current of whichever reel is being driven to wind in tape (dependent on the direction of tape travel) will increase significantly upon stalling of the motor at BOM/EOM.

The tape deck 11 further comprises the automatic track following circuit 49 which, during playback, is responsive to the timing of the sync bytes in the track signal read from tape and to the signal from the pulse generator 50 to provide an adjustment signal to the capstan servo 45, such that the heads HA, HB are properly aligned with the tracks recorded on the tape. The tape deck 11 also includes this pulse generator 50 for generating timing pulses synchronized to the rotation of the heads HA, HB.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos.

The deck controller 52 is itself governed by control signals issued by the system controller 43. The deck controller 52 is arranged to output to the controller 43 signals indicative of BOM and EOM being reached.

The system controller 43 serves both to manage high-level interaction between the computer and storage apparatus and to coordinate the functioning of the other units of the storage apparatus in carrying out the basic operations of Load-Record-Search-Playback-Unload requested by the computer. In this latter respect, the controller 43 serves to coordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F.RWD).

For fast searching in particular, the system receives a request via the interface unit 40 to move the tape to a specified location, which may be defined for example in terms of end-of-data (e.g. to append new data), a required record number or saved set number. The system controller 43 then requests the deck controller 52 to implement Fast Forward or Fast Rewind of the tape, at the same time causing the frame data processor 41 and the signal organizer 42 to read the Header regions of as many fragments as possible as they pass the heads HA and HB. When a Header is read the CRC code in the two parity bytes is used by the MDA processor to check that the Header's contents have not been corrupted. Then the Area ID sub code in byte W2 is extracted and passed to the system controller 43, which examines the sub code to determine whether it has the value (binary x101) indicating that the track currently being read is located in the EOD area of the tape.

If an EOD sub code is found, the system controller 43 requests the deck controller 52 to cease Fast Forwarding of the tape. If the requested tape location was the end-of-data the request has now been satisfied, and the next operation requested by the computer via the interface unit 40 can commence. If some other tape location was requested (e.g. a specified record number) and end-of-data has been reached without that location being encountered, then an error has occurred and this is signalled to the computer. Nonetheless, checking for an EOD sub code ensures that the tape is not advanced beyond the actual end-of-data (e.g. into a region containing obsolete data from an old storage operation).

Provided the Area ID sub code has the value binary x100 (data area), the W3 to W6 sub codes are extracted and used as appropriate to test whether the tape location requested by the computer has been reached. If so the deck controller 52 is requested to cease Fast Forwarding of the tape, and then to position the tape at the beginning of the data at the requested location. Thereafter the deck controller 52 is requested to advance the tape at normal speed, while the required data is retrieved by the signal organizer 42, the frame data processor 41 and the group processor 44.

The inclusion of Area ID and other sub codes in the Header region of every fragment 27 provides several advantages. In particular, these sub codes occur sixty-four times throughout the length of every track, in contrast to the much smaller number of occurrences, at the ends of each track only, in the prior arrangement. This much larger number, and more regular occurrence, of sub codes used during fast searching significantly increases the chance of successful detection of the relevant sub code during the search. Accordingly the speed of tape advance can be increased by at least a factor of two without compromising the reliability of detection of the sub codes.

In addition, the processing overhead required to detect the sub codes is reduced with the arrangement shown in FIG. 3. In the prior arrangement detection of a sub code involved reading two complete thirty-two byte blocks in a sub area, and performing a level C1 error check to ensure that the contents of the blocks had not been corrupted. The arrangement shown in FIG. 3 requires reading only the eight bytes of the Header region 28, followed by a simple and very quick CRC check using the two parity bytes. Thus the required data processing can be accomplished very much faster, again enabling more rapid fast searching to be performed.

What is claimed is:

1. A method of storing digital signals containing auxiliary information in each of a plurality of tracks extending over a recording medium comprising the steps of:

forming in each track a single storage area for storing data and auxiliary information in that track;

dividing said storage area into a plurality of sections each comprising a header portion and a data portion;

selecting a section for storage of auxiliary information;

generating an item of auxiliary information indicative of logical position on said medium of said selected section, said item of auxiliary information that is indicative of said logical position being capable of specifying at least a Data area and an End of Data (EOD) area, wherein said EOD item of auxiliary information is indicative that the respective section is in an end-of-data recording medium area; and storing said item of auxiliary information in said header portion of every section within a storage area occupied by said selected section.

2. The method of claim 1, wherein said EOD item of auxiliary information indicative of an end-of-data recording medium area is repeated in the header portion of sections in a multiplicity of successive tracks in that recording medium area.

3. The method of claim 2, wherein said item of auxiliary information is indicative of logical position of data to be stored in said data portion of said selected section, in terms of at least one of a count of records stored on said medium in association with said selected data; a count of file marks related to data stored on said medium in association with said selected data; a count of set marks related to data stored on said medium in association with said selected data; and a logical partition of said recording medium occupied by said selected data.

4. An apparatus for storing digital signals containing data and auxiliary information in each of a plurality of tracks extending over a recording medium, comprising:

means for forming in each track a single storage area for storing data and auxiliary information in that track;

means for dividing said storage area into a plurality of sections each comprising a header portion and a data portion;

means for selecting a section for storage of auxiliary information;

means for generating an item of auxiliary information indicative of logical position on said medium of said selected section, said item of auxiliary information that is indicative of said logical position being capable of specifying at least a Data area and an End of Data (EOD) area, wherein said EOD item of auxiliary information is indicative that the respective section is in an end-of-data recording medium area; and means for storing said item of auxiliary information in said header portion of every section within a storage area occupied by said selected section.

5. The apparatus of claim 4, wherein said EOD item of auxiliary information indicative of an end-of-data recording medium area is repeated in the header portion of sections in a multiplicity of successive tracks in that recording medium area.

6. The apparatus of claim 4, wherein said generating means generates said item of auxiliary information to be indicative of logical position of data to be stored in said data portion of said selected section, in terms of at least one of:

a count of records stored on said medium in association with said selected data;

a count of file marks related to data stored on said medium in association with said selected data;

a count of set marks related to data stored on said medium in association with said selected data; and a logical partition of said recording medium occupied by said selected data.

7. A recording medium for storing digital signals containing data and auxiliary information in each of a plurality of tracks extending over said recording medium, said recording medium having formed in each track a single storage area for storing data and auxiliary information in that track, said storage area being partitioned into a plurality of sections each of which comprises a header portion and a data portion, wherein each of said header portions comprises, in sequence, synchronization information, six bytes (W1–W6) for storing auxiliary information, and data integrity information, wherein at least one of bytes W1 and W2 stores Area ID information for specifying that a particular section is located in one of a Device area, a Reference area, a System area, a Data area, or an End of Data (EOD) area, and byte W2 stores said Area ID information as a four bit code in the most significant bits (b8 to b5) of byte W2.

8. A recording medium as in claim 7, wherein bytes W1 and W2 store information relating to the section, including section type and section address, and wherein bytes W3–W6 are used to store sub codes.

9. A recording medium as in claim 8, wherein said sub codes provide logical structure information.

10. A recording medium as in claim 8, wherein said sub codes provide recording medium usage information.

11. A recording medium as in claim 7, wherein said data integrity information is comprised of two bytes of parity data.

12. A recording medium as in claim 7, wherein said synchronization information is comprised of one byte of synchronization data.

13. A recording medium for storing digital signals containing data and auxiliary information in each of a plurality of tracks extending over said recording medium, said recording medium having formed in each track a single storage area for storing data and auxiliary information in that track, said storage area being partitioned into a plurality of sections each of which comprises a header portion and a data portion, wherein each of said header portions comprises, in sequence, synchronization information, six bytes (W1–W6) for storing auxiliary information, and data integrity information, wherein at least one of bytes W1 and W2 stores Area ID information for specifying that a particular section is located in one of a Device area, a Reference area, a System area, a Data area, or an End of Data (EOD) area, and said Area ID information is repeated 64 times throughout each track located in the respective area.

14. A recording medium as in claim 13, wherein bytes W1 and W2 store information relating to the section, including section type and section address, and wherein bytes W3–W6 are used to store sub codes.

15. A recording medium as in claim 14, wherein said sub codes provide logical structure information.

16. A recording medium as in claim 14, wherein said sub codes provide recording medium usage information.

17. A recording medium as in claim 13, wherein said data integrity information is comprised of two bytes of parity data.

18. A recording medium as in claim 13, wherein said synchronization information is comprised of one byte of synchronization data.

* * * * *

UNITED STATES PATENT AND TRADEMARK OFFICE
CERTIFICATE OF CORRECTION

PATENT NO. : 6,229,659 B1  
DATED : May 8, 2001  
INVENTOR(S) : Watkins et al.

Page 1 of 1

It is certified that error appears in the above-identified patent and that said Letters Patent is hereby corrected as shown below:

Column 10, claim 2,  
Line 13, please delete "EOD";

Column 10, claim 3,  
Line 18, Claim 3 depends from Claim 1 (not Claim 2)

Signed and Sealed this

Twenty-fifth Day of December, 2001

Attest:

Attesting Officer

JAMES E. ROGAN  
Director of the United States Patent and Trademark Office